C. C. ARMSTRONG.

GLOBE HOLDER.

APPLICATION FILED JULY 19, 1913.

Reissued Dec. 16, 1919.

14,769.

Attest.
Mehrling Stahl
C E Parsons

Inventor.
Charles C. Armstrong.
By Spear, Middleton, Donaldson & Spear
Attys.

UNITED STATES PATENT OFFICE.

CHARLES C. ARMSTRONG, OF MARYSVILLE, OHIO, ASSIGNOR, BY MESNE ASSIGNMENTS, TO WELSBACH COMPANY, OF GLOUCESTER CITY, NEW JERSEY, A CORPORATION OF NEW JERSEY.

GLOBE-HOLDER.

14,769. Specification of Reissued Letters Patent. Reissued Dec. 16, 1919.

Original No. 1,014,433, dated January 9, 1912, Serial No. 622,372, filed April 20, 1911. Application for reissue filed July 19, 1913. Serial No. 780,057.

*To all whom it may concern:*

Be it known that I, CHARLES C. ARMSTRONG, a citizen of the United States, residing at Marysville, Ohio, have invented certain new and useful Improvements in Globe-Holders, of which the following is a specification.

My present invention relates to improvements in that class of holders designed for securing globes to gas and electric light fixtures, and has, among others, for its objects to produce a simple and extremely economical device by which the globe will be properly centered and securely held in place and against accidental displacement, and which yet may be quickly and easily manipulated to permit the removal or replacement of the globe when desired.

The invention includes the novel features of construction and arrangement and combination of parts hereinafter described and particularly set forth in the appended claims.

A globe holder constructed in accordance with my invention is illustrated in the accompanying drawings, in which—

Figure 1:
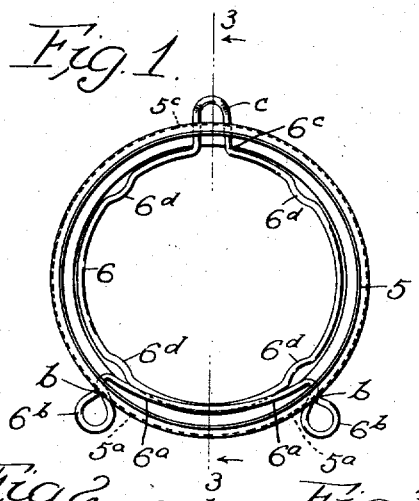
Figure 1 is a plan view.
Figure 2:
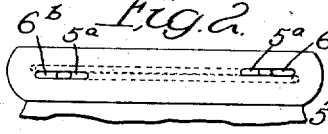
Fig. 2 is a side elevation.
Figure 3:
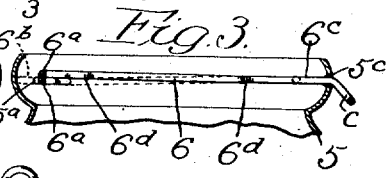
Fig. 3 is a section on line 3—3 of Fig. 1.
Figure 4:
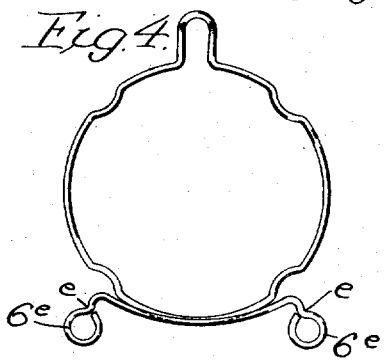
Fig. 4 is a detail view of a modification.

Referring by reference characters to this drawing, the numeral 5 designates the globe holding collar which may be of the ordinary or any desired construction for holding the globes of either upright or inverted burners. The means for retaining the globe in place in the collar comprises a spring wire 6 bent into approximately circular form and with the ends overlapping as indicated at $6^a$, the spring of the wire tending to contract it into a circle of smaller diameter than the retaining flange with which all globes are provided. The ends of the overlapping portions $6^a$ of the wire are extended approximately radially outward through elongated slots $5^a$ in the side of the collar, and are provided with knobs or handles to be grasped by the thumb and finger by which they may be drawn toward each other when the globe is to be released. The handles are formed by bending the ends into a loop or circle $6^b$ and these circular portions, coupled with the bend of the wire adjacent thereto, provide notches *b* which engage the metal of the collar at the outer ends of the slots and cause the coil of the holder to be held in a concentric position within the collar when in its contracted position, thus properly centering the coil and preventing any movement of the holder within the collar and consequent rattling. On its opposite side the coil 6 is provided with an integral radial loop or projection $6^c$ which extends through a slot $5^c$ in the wall of the holder. This serves to support the opposite side of the coil, and in order to further guard against accidental displacement of the coil the outer end of the projection is bent downward as indicated at *c*. The coil is preferably provided with humps or small inward bands as indicated at $6^d$ which bear against the globe and prevent contact of the coil with the glass throughout its entire extent, thus reducing the liability of breaking of the glass.

From the foregoing description it will be seen that normally the globe is firmly retained by the contraction of the coil, but when the globe is to be released the ends of the coil are drawn toward each other, thus causing enlargement of the coil until it is of a size sufficient to permit the ends to be drawn together until the coil bears against the interior wall of the holder all around, which insures disengagement of the coil with the flange of the globe throughout the entire circumference thereof. When no globe is in position in the holder the coil is held properly centered in the holder or concentric therewith by the engagement of the notches of the outwardly extended ends with the outer ends of the slots.

Instead of handles on the ends of the coil being formed by outward bending of the ends, as indicated at $6^b$, they may be formed by inward bends as indicated at $6^e$ and the notches or recesses formed by reverse bends of the wire as indicated at *e*.

Having thus described my invention what I claim is:—

1. The combination with a collar, of a holder, consisting of a piece of resilient material bent to form a coil with overlapping parts, said collar having elongated slots and said overlapping parts having terminal handle portions extending outwardly through the slots, and having centering notches for engaging the outer ends of the slots.

2. The combination with a collar, of a holder consisting of a piece of resilient material bent to form a coil with overlapping parts, said collar having elongated slots and said overlapping parts having terminal handle portions extending outwardly through the slots, said handle portions being formed by approximately circular bends of the ends of the wire, said bends providing notches for engagement with the outer ends of the slots.

3. The combination with a collar, of a holder consisting of a piece of resilient material bent to form a coil with overlapping parts, said collar having elongated slots and said overlapping parts having terminal handle portions extending outwardly through the slots, and having centering notches for engaging the outer ends of the slots, said coil having on the side opposite said overlapping parts an integral projection seated in a slot in the holder and provided with a deflected retaining end.

4. The combination with a collar, of a holder consisting of a piece of resilient material bent to form a coil with overlapping arms, and an integral loop on the side opposite said arms, said collar having elongated slots through which portions of said arms project, said collar having also a slot through which said loop projects, said loop and slot being relatively constructed to limit the radial movement of the loop in the slot.

5. The combination with a collar, of a holder consisting of a piece of resilient material bent to form a coil with overlapping arms and an integral loop on the side opposite said arms, said collar having elongated slots through which portions of said arms project, said collar having also a slot through which said loop projects, said loop having a bent portion for engaging the wall of the slot to prevent accidental displacement of the loop.

6. The combination with a collar, of a holder consisting of a piece of resilient material bent to form a coil with overlapping arms, and an integral loop on the side opposite said arms, said collar having elongated slots through which portions of said arms project, said collar having also a slot through which said loop projects, said loop being bent bodily out of the plane of the holder.

7. In combination, a collar having a slot and a spring wire holder comprising a coil of wire within the collar and having an integral loop held within the slot, and having a bend coacting with the edge of the slot to prevent accidental displacement.

8. In a globe holder, the combination of a neck formed at one side with a horizontally extending slot, a spring clasp of coil form within the neck and adapted to contract and expand for engaging or disengaging a globe, the clasp being formed at one side with an outwardly extending loop projecting through the horizontal slot in the neck and having its external portion bent downwardly to prevent disengagement of the loop and neck when the parts are in their normal position, the clasp having at the opposite side of the neck projecting handles for expanding and contracting it.

9. The combination with a collar of a wire holder within the collar having handles projecting through the collar and also having a projection intermediate the handles, said collar having a slot through which the projection extends, said projection being so bent as to co-act with the edge of the slot and thereby prevent its accidental withdrawal from the slot.

CHARLES C. ARMSTRONG.

Witnesses:
RICHARD D. ARMSTRONG,
H. E. ULLOM.